(12) United States Patent
Raza et al.

(10) Patent No.: US 7,382,805 B1
(45) Date of Patent: Jun. 3, 2008

(54) METHOD AND APPARATUS FOR AGGREGATING ETHERNET STREAMS

(75) Inventors: S. Babar Raza, San Jose, CA (US); Edward Grivna, Brokklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 1085 days.

(21) Appl. No.: 10/315,581

(22) Filed: Dec. 9, 2002

(51) Int. Cl.
*H04J 3/12* (2006.01)
*H03M 5/00* (2006.01)

(52) U.S. Cl. ............... 370/528; 370/529; 341/58

(58) Field of Classification Search ........ 370/474–476, 370/535–545, 527–529; 375/362–370; 341/50–61
See application file for complete search history.

(56) References Cited

U.S. PATENT DOCUMENTS

| | | | | |
|---|---|---|---|---|
| 5,412,651 A | * | 5/1995 | Gorshe | 370/412 |
| 5,560,038 A | * | 9/1996 | Haddock | 709/236 |
| 6,430,201 B1 | * | 8/2002 | Azizoglu et al. | 370/535 |
| 6,624,763 B2 | * | 9/2003 | Kuo et al. | 341/58 |
| 6,768,429 B2 | * | 7/2004 | Kuo et al. | 341/58 |
| 6,873,630 B1 | * | 3/2005 | Muller et al. | 370/356 |
| 7,031,341 B2 | * | 4/2006 | Yu | 370/469 |
| 2001/0024457 A1 | * | 9/2001 | Barry et al. | 370/537 |

OTHER PUBLICATIONS

Frasier, Howard, Clause 36, Physical Coding Sublayer (PCS) and Physical Medium Attachment (PMA) sublayer, type 1000BASE-X, IEEE Std 802.3, 2000 Edition, Local and Metropolitan Area Networks, pp. 962-1008.*

* cited by examiner

*Primary Examiner*—Chi Pham
*Assistant Examiner*—Tri H. Phan
(74) *Attorney, Agent, or Firm*—Blakely, Sokoloff, Taylor & Zafman LLP

(57) ABSTRACT

Embodiments of a method and apparatus for aggregating Ethernet streams are generally described. According to but one example embodiment, implementations of a physical coding sublayer (PCS) modify one or more Ethernet streams to uniquely distinguish at least one of the Ethernet streams from the other Ethernet streams. Any two or more of the modified Ethernet streams may be interleaved to form an aggregate Ethernet stream. The aggregate Ethernet stream may by transmitted over a serial link.

18 Claims, 4 Drawing Sheets

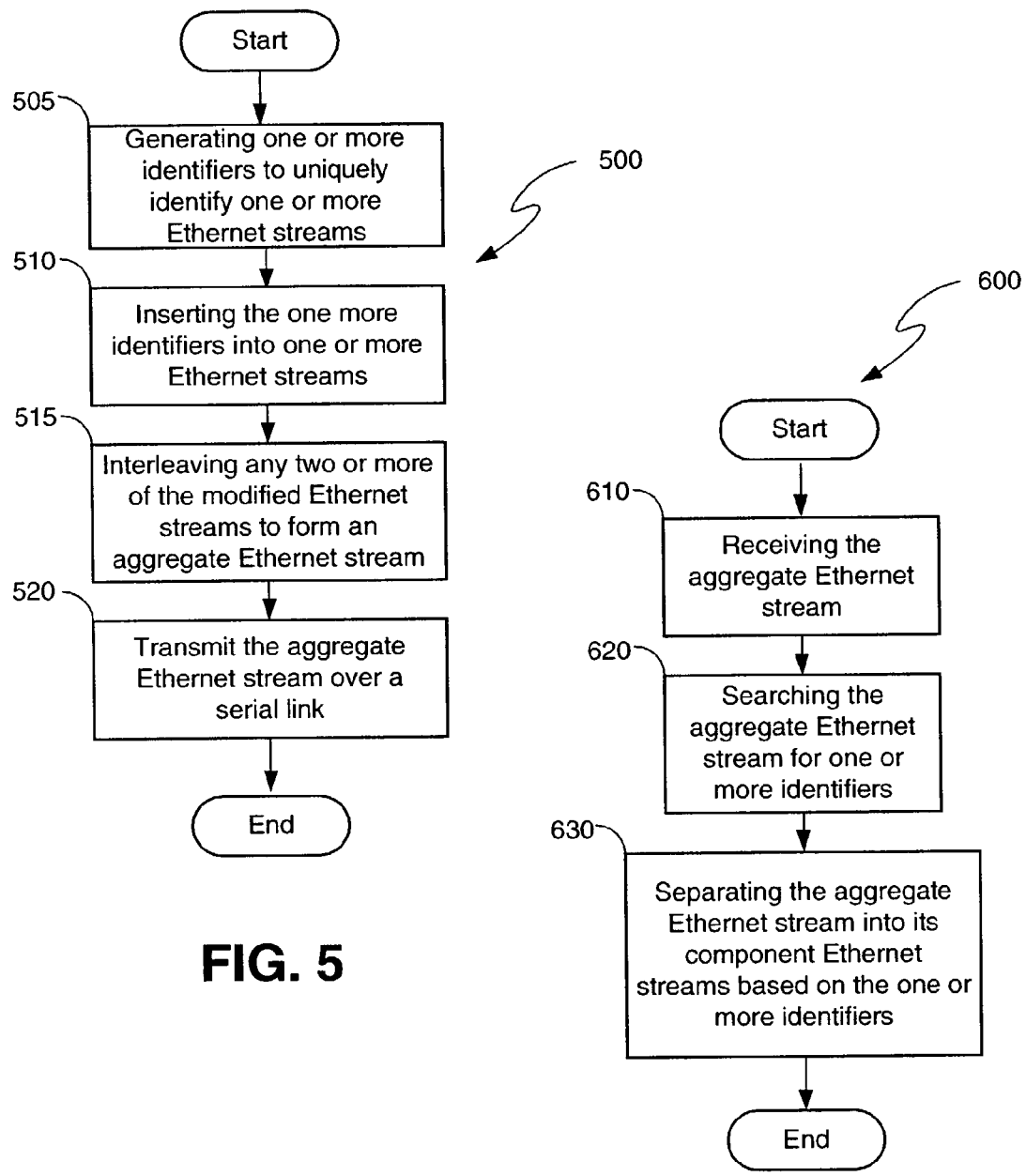

METHOD AND APPARATUS FOR AGGREGATING ETHERNET STREAMS

TECHNICAL FIELD

Embodiments of the invention generally relate to the field of Ethernet networks and, more particularly, to a method and apparatus for aggregating Ethernet streams.

BACKGROUND

FIG. 1 is a block diagram illustrating selected elements of communication system 100. Communication system 100 includes transmit/receive pairs 101 and 102. Transmit/receive pairs 101 and 102 only show data transfer in one direction and, therefore, consists of half of each link. Data flow, in the reverse direction of that depicted in FIG. 1, may use another copy of the same hardware, software, and/or firmware. Communication system 100 exemplifies a conventional approach to transporting two or more gigabit Ethernet streams. Gigabit Ethernet streams may be Ethernet streams that comply with the IEEE 802.3z standard, IEEE std. 802.3z-1998, published Sep. 1, 1998 (hereinafter, the gigabit Ethernet standard).

Transmit/receive pair 101 consists of gigabit media independent interface (GMII) 105, transmit physical coding sublayer (PCS) 110, encoder 115, serializer 120, serial link 125, de-serializer 130, framer 135, decoder 140, receive PCS 145, and receive GMII 150. Transmit/receive pair 102 may be implemented with similar elements. GMII 105 is the interface between a media access control (MAC) layer (not shown) and the elements illustrated in FIG. 1. GMII 105 typically provides an eight-bit parallel data path and a control path between the transmit MAC layer and the physical layer for transmit/receive pair 101. GMII 150 provides a similar interface between the physical layer and the MAC layer on the receive side of transmit/receive pair 101.

GMII 105 typically provides octets of data to PCS 110 through an 8-bit parallel data interface. PCS 110 receives the octets of data from GMII 105 and directs encoder 115 to encode the octets of data prior to transmission over serial link 125. Encoder 115 is typically an 8B/10B encoder as specified in the gigabit Ethernet standard. Octets of data are typically encoded into ten-bit data code-groups. 8B/10B encoding schemes are known in the art; accordingly a detailed discussion is not provided herein. PCS 110 may also direct encoder 115 to generate a number of ten-bit special code-groups, which are sometimes combined with the data code-groups. For example, a special code-group called a K28.5 may contain a unique seven-bit sequence called a comma. Commas may be used for framing operations.

PCS 110 also generates combinations of data code-groups and special code-groups known as ordered sets. Ordered sets may be used, for example, to control the running disparity of a stream or to fill the inter-packet gaps (IPGs) of a stream. The IDLE1 ordered set, for example, is typically used to change the running disparity of an Ethernet stream and the IDLE2 ordered set is typically used to fill the IPGs of the Ethernet stream. The encoded data code-groups, special code-groups, and ordered sets are delivered to Serializer 120. Serializer 120 serializes the encoded information and transmits it over serial link 125. Serial link 125 may be a single-mode fiber optic link, a multi-mode fiber optic link, a shielded copper link, or an unshielded copper link.

De-serializer 130 deserializes the received encoded information and framer 135 determines the correct character boundaries for the received encoded information. Framer 135 may use one or more commas (e.g., as contained within the K28.5 code-group) to determine character boundaries. The framed information is then decoded into octets of data and special characters by decoder 140 and checked for synchronization by receive PCS 145. The synchronization process may be used to verify that framer 135 is correctly aligning the received code-group boundaries.

FIG. 1 illustrates that a conventional method for transporting two 1-gigabit Ethernet streams is to use two transmit/receive pairs (e.g., transmit/receive pairs 101 and 102) to transmit two 1-gigabit Ethernet streams over separate physical links (e.g., serial links 125 and 175). As described above, this conventional method for transporting two 1-gigabit Ethernet streams requires separate serializers, de-serializers, and typically separate serial links (separate serial links may not be necessary when wavelength division multiplexing is used) to transport the two 1-gigabit Ethernet streams from one location to another location. Alternatively, transmission channels that are compliant with certain synchronous optical network (SONET) standards (e.g., STS-48/OC-48 channels) may be used to transport the data of two 1-gigabit Ethernet streams if the two 1-gigabit Ethernet streams are mapped into a SONET stream.

Using STS-48/OC-48 channel serial links to transport multiple gigabit Ethernet streams introduces a number of problems. First, mapping gigabit Ethernet streams into a SONET stream requires the hardware overhead of full SONET framers. Full SONET framers, in turn, introduce latencies of at least 250 μs is to the transported streams. Also, additional internetworking hardware is required at both ends of the link to map the Ethernet streams into a SONET stream and to extract the multiple Ethernet streams from the payload section of the received SONET frames.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a block diagram illustrating selected elements of conventional communication system 100.

FIG. 2 is a block diagram illustrating one embodiment of selected elements of a communication system, implemented according to an embodiment of the invention.

FIG. 3 is a state diagram illustrating selected elements of a physical coding sublayer, implemented according to an embodiment of the invention.

FIG. 4 is a block diagram of selected elements of a computing system implemented according to an embodiment of the invention.

FIG. 5 is a flow diagram illustrating certain aspects of a method for aggregating Ethernet streams according to an embodiment of the invention.

FIG. 6 is a flow diagram illustrating certain aspects of a method for separating a received aggregate Ethernet stream according to an embodiment of the invention.

DETAILED DESCRIPTION

Embodiments of the invention are generally directed to a method and apparatus for aggregating Ethernet streams. In one embodiment, an implementation of a physical coding sublayer (PCS) modifies one or more Ethernet streams to uniquely distinguish each of the one or more Ethernet streams one from another. Any two or more of the modified Ethernet steams may be interleaved to form an aggregate Ethernet stream.

Figure 1:
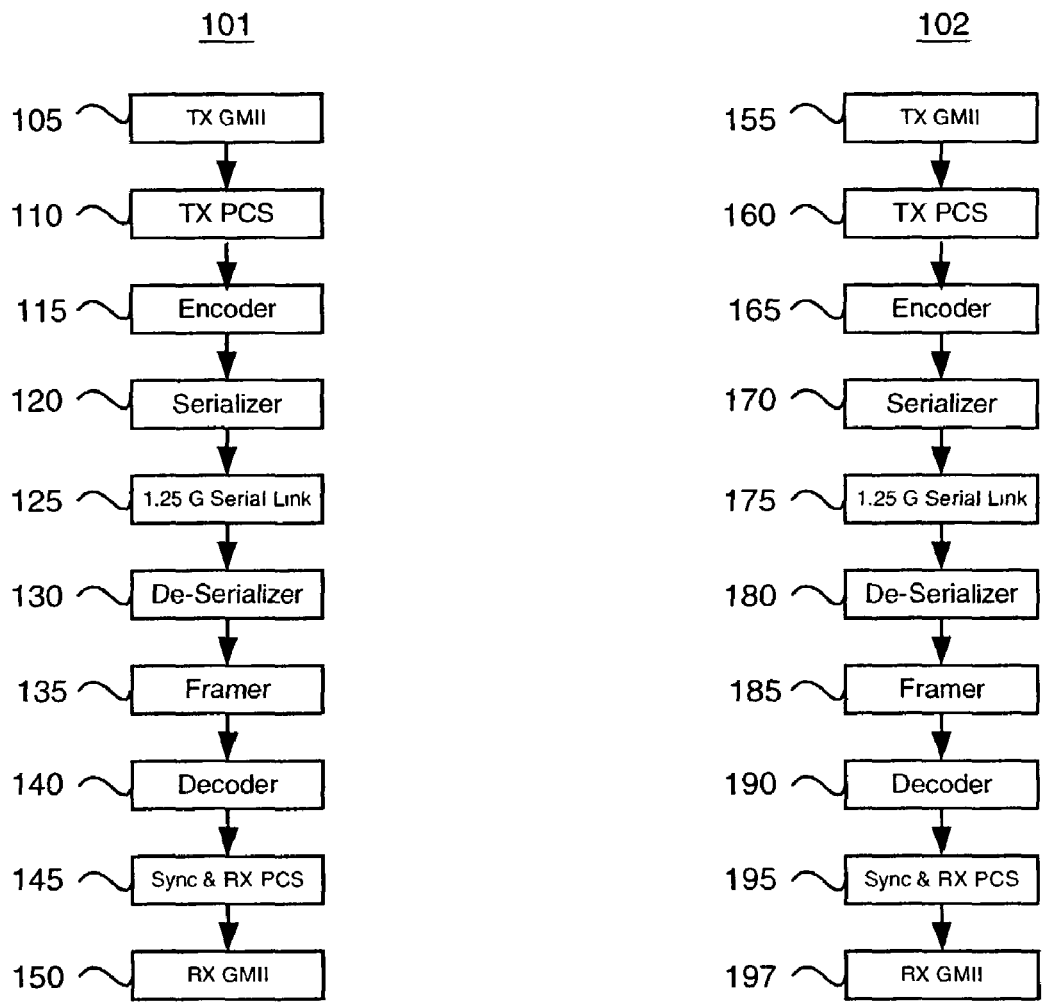
Figure 2:
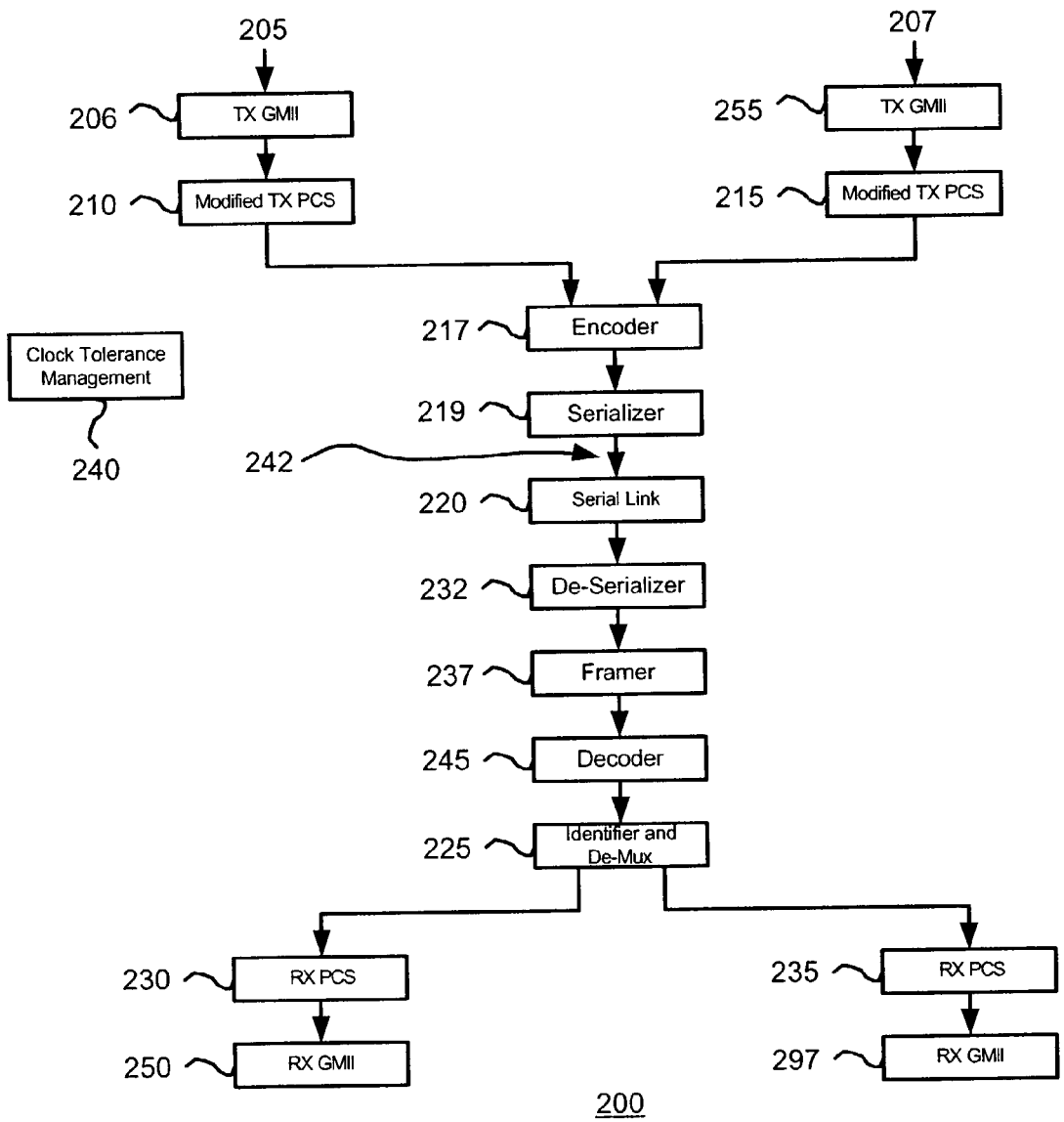

FIG. 2 is a block diagram illustrating one embodiment of selected elements of communication system 200. Communication system 200 may include modified transmit PCSs 210 and 215, serial link 220, identifier 225, and receive PCSs 230 and 235. In alternative embodiments of the invention, only one of transmit PCSs 210 and 215 may be modified. In one embodiment, communication system 200 modifies one or more Ethernet streams to uniquely distinguish the streams from each other. Communication system 200 may then interleave two or more of the modified Ethernet streams to form an aggregate Ethernet stream. In some embodiments of the invention, a modified Ethernet stream is interleaved with one or more unmodified Ethernet streams to form an aggregate Ethernet stream. The aggregate Ethernet stream may be transported over a serial link (e.g., serial link 220).

Reference numerals 205 and 207 illustrate Ethernet streams (hereinafter, input data streams 205 and 207) passed from an implementation of a media access control (MAC) layer to gigabit media independent interfaces (GMIIs) 206 and 255, respectively. GMII 206 and 255 typically provide octets of data to modified transmit PCSs 210 and 215 respectively through eight-bit parallel data interfaces. Similarly, on the receive side, GMII 250 and 297 typically receive octets of data from receive PCSs 230 and 235, respectively.

In one embodiment, Ethernet streams 205 and 207 originate from a common dual-channel MAC. In such an embodiment, input data streams 205 and 207 may share a single transmit character clock reference. Input data streams 205 and 207, however, will normally be asynchronous to each other with respect to data flow, packet size, and inter-packet gap (IPG) length and location. In some embodiments, input data streams 205 and 207 may be compliant with the gigabit Ethernet standard. Input data streams 205 and 207 are delivered to modified transmit PCS blocks 210 and 215, respectively.

Modified transmit PCSs 210 and 215 may generate identifiers to uniquely identify input data streams 205 and 207. Conventional transmit PCSs, generate two types of IDLE ordered sets. The first type, IDLE1, is used to alter the running disparity (when necessary) at the end of a frame. The second type, IDLE2, is used to fill the IPGs between frames. As will be further discussed below, in one embodiment, IDLE ordered sets are modified and are used to identify Ethernet streams one from another.

DC balance refers to transmitting an equal number of ones and zeros on a link. Running disparity is a calculation used to achieve DC balance in transmission. In conventional communication systems, IDLE1 ordered sets may be used to force a specific running disparity into the IPGs. In contrast, conventional IDLE2 ordered sets maintain the running disparity of a transmission. This feature of conventional communication systems may be useful when transmitted data is routed through a repeater, hub, or switch, before being presented at a different GMII interface. Some embodiments of the present invention are implemented in direct GMII to GMII connection. In such embodiments, there is no need to force a specific running disparity into the IPGs, or to maintain a specific running disparity within the IPGs. Thus, in some embodiments, two or more source Ethernet streams may be character interleaved, without regard to the running disparity of the characters within the IPG, to create the resulting aggregate Ethernet stream.

Since Ethernet streams may be interleaved without a need to force a specific running disparity in the IPGs, in some embodiments, the IPGs in one or more source streams may be filled with alternative mappings of the IDLE ordered set. Similarly, in some embodiments, the modified transmit PCSs 210 and 215 need not generate IDLE1 ordered sets. Thus, in some embodiments, input data streams 205 and 207 may be modified by mapping different IDLE ordered sets into each stream. The modified streams may then be delivered to the proper destination, as will be further described below.

Figure 3:
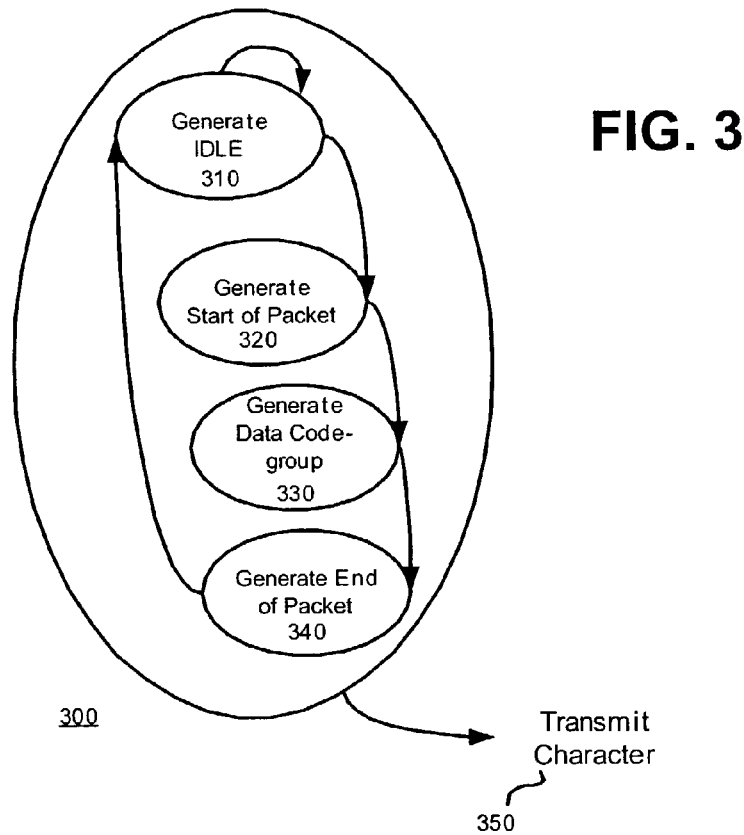

FIG. 3 illustrates selected elements of a modified transmit PCS state machine 300. According to one embodiment, modified transmit PCS state machine 300 may be used to control the transmission of an Ethernet stream (e.g., input data streams 205 and 207 shown in FIG. 2). In the illustrated implementation, modified transmit PCS state machine 300 provides four states including: generate IDLE 310, generate start of packet 320, generate data code-group 330, and generate end of packet 340. Alternative embodiments may include more or fewer states than those illustrated in FIG. 3. Generate start of packet 320 and Generate end of packet states 340 cause the modified transmit PCS 300 to generate special code-groups corresponding to the beginning and end of a transmitted packet, respectively.

Generate IDLE 310, according to one embodiment, generates an IDLE ordered set that may be used to identify an Ethernet stream. In conventional communication systems, IDLE ordered sets consist of a K28.5 special code-group followed by either a D16.2 or D5.6 data code-group. In some embodiments, the K28.5/D16.2 IDLE ordered set may be used to fill the IPGs on all but one of the two or more Ethernet streams and a different data code-group character may be coupled with the K28.5 special code-group to identify one of the Ethernet streams. In alternate embodiments, the K28.5/D16.2 IDLE may be used to fill all IPGs on one of the two or more Ethernet streams, so long as a different data code-group character is coupled with the K28.5 special code-group to differentiate the remaining Ethernet streams.

In one embodiment, a separate instance of modified transmit PCS state machine 300 exists for each Ethernet stream that is interleaved to form the aggregate Ethernet stream. The corresponding Generate IDLE 310 state in each of those instances of transmit PCS 300, in one embodiment, generates a different IDLE ordered set. Thus, one instance of PCS 300 (e.g., 210 shown in FIG. 2) may generate K28.5/D16.2 to identify a first Ethernet stream (e.g., input data stream 205) and a second instance of transmit PCS 300 (e.g., 215 shown in FIG. 2) may generate K28.5/D16.8 to identify a second Ethernet stream (e.g., input data stream 207).

The gigabit Ethernet standard specifies the ordered sets (e.g., table 36-3) that may be used by conventional communication systems. In one embodiment of the invention, if two or more Ethernet streams are interleaved together, at least one of the streams may use an IDLE ordered set that is different from the ordered sets that are allowed by the gigabit Ethernet standard. In such an embodiment, the characters of the two or more Ethernet streams may be interleaved in a fixed sequence. As will be further discussed below, in such an embodiment, an identifier element (e.g., identifier 225 shown in FIG. 2) identifies the Ethernet stream using the unique IDLE ordered set. In such an embodiment, the destination channel for characters of all other Ethernet steams is known once the stream containing the unique IDLE ordered set has been identified, because the remaining streams are de-multiplexed in the same order they are interleaved.

Thus, in an embodiment, each instance of transmit PCS 300, inserts an IDLE sequence that is allocated to the particular channel, as well as the normal state handling required to map the GMII transitions into an 8B/10B character stream. Referring again to FIG. 2, modified transmit PCS 210 and 215 each in turn may send a single output character to encoder 217. In some embodiments, encoder 217 is an 8B/10B encoder and the output characters are encoded according to an 8B/10B encoding scheme.

Serializer 219 serializes the ten-bit transmission characters, generated by encoder 217, and transmits them over serial link 220. Various logical bus-width matching mechanisms and gearboxes may be used between encoder 217 serial link 220 to accommodate any internal interfaces of the serializer and an operating speed of the internal logic. In one embodiment, serial link 220 is approximately equivalent to an STS-48/OC-48 channel. In such an embodiment, input data streams 205 and 207 comply with the gigabit Ethernet standard and are transmitted over serial link 220 at approximately 2.5 gigabaud. In alternative embodiments, serial link 220 may be an STS-96/OC-192 channel or any other channel with a transmission speed suitable for transporting an aggregate Ethernet stream.

In one embodiment, de-serializer 232 receives the transmitted aggregate Ethernet stream and converts the serial stream to a parallel stream. Various logical bus-width matching mechanisms and gearboxes may be used between de-serializer 232 and framer 237 to accommodate any internal interfaces of the de-serializer and an operating speed of the internal logic. Such bus-width matching mechanisms and gearboxes are known to those of ordinary skill in the art and will not be further discussed except as they relate to embodiments of the invention. Thus, communication system 200 may transport two or more gigabit Ethernet streams without using separate serializers, de-serializers, and serial links for each stream.

Framer 237 frames the parallel data to the correct character boundaries. In one embodiment, framer 237 detects one or more framing characters (e.g., the K28.5 or other special characters containing the comma bit sequence) and determines character boundaries based on the detected framing characters. In some embodiments in which two 1-gigabit Ethernet streams are character interleaved together, the maximum separation between framing characters is three other characters. In alternate embodiments in which more than two Ethernet streams are interleaved together, the maximum separation between framing characters may increase by two characters for each additional Ethernet stream. For example, in one embodiment in which four 1-gigabit Ethernet streams are interleaved for transport on a five gigabaud serial link, the maximum separation between framing characters may be seven other characters.

Decoder 245 receives the framed characters and decodes them. In one embodiment, decoder 245 is an 8B/10B decoder as specified in the gigabit Ethernet standard. Identifier 225 searches the decoded characters for the modified IDLE identifiers inserted by modified transmit PCSs 210 and 215. In some embodiments of the invention, in which only one of transmit PCSs 210 and 215 are modified, identifier 225 searches the decoded characters for a modified IDLE ordered set inserted by the modified transmit PCS. Identifier 225 may demultiplex the decoded characters based on the located identifiers.

In some embodiments, one of the identifiers is a unique IDLE ordered set that is different from the ordered sets that are allowed under table 36-3 of the gigabit Ethernet standard. In such embodiments, the characters of the Ethernet streams may be interleaved in a fixed sequence. Identifier 225 searches the received aggregate Ethernet stream for the unique IDLE ordered set. Once identifier 225 locates the unique IDLE ordered set, it routes the associated character stream to a receive PCS (e.g., receive PCS 230) associated with the unique IDLE ordered set. The characters of the remaining Ethernet streams may be demultiplexed sequentially because they were interleaved sequentially.

Receive PCSs 230 and 235 may synchronize the decoded characters for ordered sets as described in the gigabit Ethernet standard. Receive PCSs 230 and 235 then map the synchronized character streams to the data and states of receive GMIIs 250 and 297. In an embodiment, the mapping of the synchronized character streams is performed according to the gigabit Ethernet standard. As described above, communication system 200 transports two (or more) gigabit Ethernet streams over a serial link without using full SONET framers.

In some embodiments, input data streams 205 and 207 may be asynchronous from each other, and from the serial output 242, in frequency. For example, in some embodiments input data stream 205 may be clocked at a slightly different frequency than serial output 242. In such embodiments, a clock tolerance management block may be used to compensate for the differences in clocking frequencies.

Referring again to FIG. 2, clock tolerance management block 240 may be implemented in both the transmit and receive interfaces to perform rate adaptation. For example, clock tolerance management block 240 may be implemented in GMII 206 or modified transmission PCS 210 of the receive interface. Also, clock tolerance management block 240 may be implemented in modified receive PCS 230 or receive GMII 250 of the receive interface. In some embodiments, clock tolerance management block 240 is implemented with one or more first-in-first-out (FIFO) buffers.

In some embodiments, serial link 220 must be operated at a rate that is slightly slower than 2.5 gigabits per second. For example, in some embodiments, serial link 220 may be operated at a signaling rate of approximately 2.488 gigabits per second. In such embodiments, clock tolerance management block 240 may perform rate adaptation. In some embodiments, rate adaptation includes deleting one or more characters in all IPGs on the transmit interface of serial link 220 and adding one or more characters back into the IPGs on the receive interface of serial link 220.

For example, in some embodiments, the maximum packet length is greater than 1500 characters. In such embodiments, IPGs may typically contain six IDLE ordered sets. A clock tolerance management block (e.g., block 240) may reduce the number of ordered sets in each IPG to a single ordered set (e.g., containing a single framing character for framing purposes). The deleted ordered sets may be re-inserted by a clock tolerance management block (e.g., block 240). In some embodiments, clock tolerance management block 240 may reduce packet payload, and thereby at least partly compensate for a reduced transmission speed over serial link 220, by removing one or more fixed preamble characters from transmitted packets. In some embodiments, clock tolerance management block 240 may reinsert the fixed preamble characters.

Figure 4:
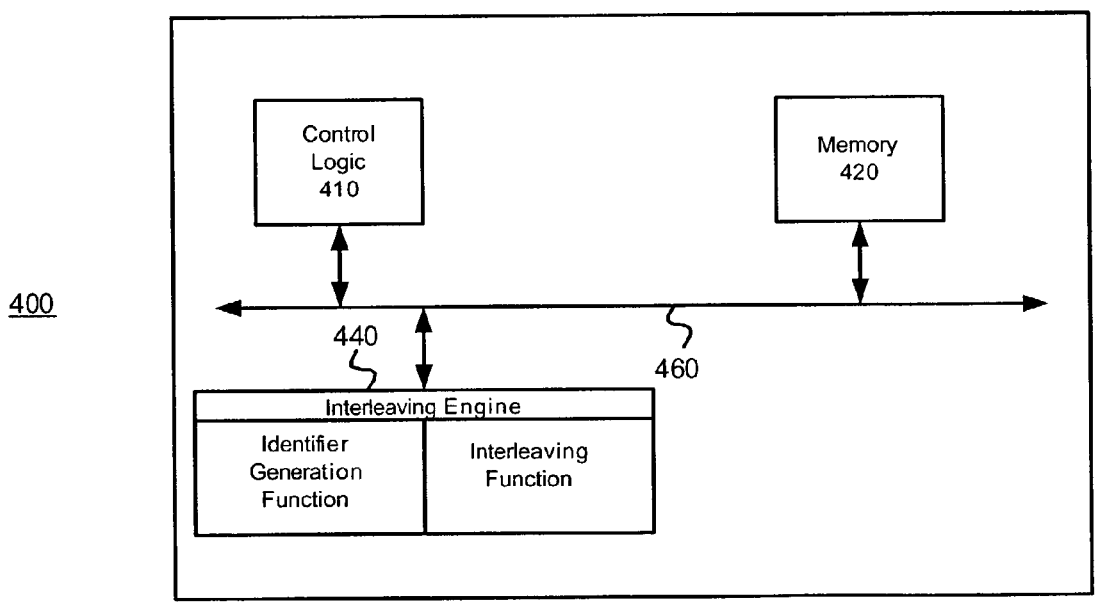

FIG. 4 illustrates one embodiment of selected elements of computing system 400. Computing system 400 includes control logic 410, memory 420, and interleaving engine 440.

The illustrated elements may be connected together through system interconnect 460. Control logic 410 may include a microprocessor, microcontroller, field programmable gate array (FPGA), application specific integrated circuit (ASIC), central processing unit (CPU), programmable logic device (PLD), and similar devices that access instructions from system storage (e.g., memory 420), decode them, and execute those instructions by performing arithmetic and logical operations.

Memory 420 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 420 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 420 may store program modules such as routines, programs, objects, images, data structures, program data, and other program components that perform particular tasks or implement particular abstract data types that facilitate system use.

System interconnect 460 permits communication between the various elements of computing system 400. System interconnect 460 may include a wide variety of signal lines including one or more of a memory bus, peripheral bus, local bus, host bus, bridge, optical, electrical, acoustical, and other propagated signal lines.

Interleaving engine 440 provides the functions of generating one or more identifiers and interleaving any two or more of the modified Ethernet streams to form an aggregate Ethernet stream. Interleaving engine 440 may be implemented with software routines, hardware circuits, firmware, or a combination thereof. In some embodiments, a modified transmit PCS state machine (e.g., modified transmit PCS state machine 300) provides the identifier generation function.

The term aggregate Ethernet stream may refer to the result of interleaving the characters of two or more Ethernet streams together to form a single stream of characters. The interleaving function may be performed by encoding the characters of two or more Ethernet streams with a particular 8B/10B encoder to form an aggregate Ethernet stream. The encoding may occur in a fixed sequence, in some embodiments of the invention.

Description of Flow Charts

Turning now to FIGS. 5 and 6, the particular methods associated with embodiments of the invention are described in terms of computer software and hardware with reference to two flowcharts. The methods to be performed by an apparatus for aggregating Ethernet streams constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a base station) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 5 is a flow diagram illustrating certain aspects of a method for aggregating Ethernet streams according to an embodiment of the invention. Referring to process block 505, in one embodiment, implementations of a physical coding sublayer (PCS) generate one or more identifiers to uniquely identify one or more Ethernet streams. In one embodiment, an implementation of a PCS sublayer (e.g., modified transmit PCS 210 shown in FIG. 2) generates a particular IDLE ordered set to uniquely identify an Ethernet stream. In some embodiments, separate contexts of a single PCS implementation generate an identifier for each Ethernet stream that is to be uniquely identified. In alternative embodiments, a separate PCS implementation generates each of the one or more identifiers.

The one or more identifiers are inserted into one or more corresponding Ethernet streams at process block 510. In one embodiment, the identifiers are inserted into inter-packet gaps (IPG) between encoded characters of the one more Ethernet streams. In alternate embodiments, the identifiers may replace characters in the preamble of the encoded characters.

In process block 515, any two or more of the modified Ethernet streams are interleaved to form an aggregate Ethernet stream. In one embodiment, the two or more Ethernet streams are interleaved on a character-by-character basis. For example, a single encoder may be used to encode the characters of the two or more Ethernet streams. Each of the two or more modified Ethernet streams may input a character to the encoder in turn. Alternatively, the encoder may accept two or more characters at the same time and encode multiple characters simultaneously. In one embodiment, the order by which the two or more modified Ethernet streams input a character to the encoder may be fixed.

In process block 520, the aggregate Ethernet stream is transmitted over a serial link. In one embodiment, two 1-gigabit Ethernet streams are modified and interleaved to form the aggregate Ethernet stream. The aggregate Ethernet stream is transmitted over a serial link with a transmission rate of approximately 2.5 gigabaud (e.g., over an STS-48/OC-48 channel). In alternate embodiments, more than two 1-gigabit Ethernet streams are interleaved together to form an aggregate Ethernet stream. In such embodiments, a serial link with a transmission rate greater than 2.5 gigabaud may be used (e.g., an STS-96/OC-192 channel).

FIG. 6 is a flow diagram illustrating certain aspects of receiving and separating an aggregate Ethernet stream. Referring to process block 610, the aggregate Ethernet stream is received on a serial link. The received aggregate Ethernet stream may be de-serialized and converted to parallel ten-bit code-groups. The parallel code-groups may be framed to the correct character boundaries, for example, through detection of a K28.5 or other special code-group containing a comma bit sequence. The framed data is then decoded with, for example an 8B/10B decoder.

Referring to process block 620, the decoded character stream is searched for the one or more identifiers. In one embodiment, a comparator (or similar hardware) may be used to search the decoded character stream. In alternate embodiments, software running on a processor is used to search the decoded character stream. In yet other embodiments, firmware or some combination of hardware, software, and/or firmware is used to search the decoded character stream.

After the one more identifiers are located, the aggregate Ethernet stream is separated into its component Ethernet streams as illustrated by process block 630. In one embodiment, when a unique identifier is located, the character stream associated with that unique identifier is routed to a modified receive PCS state machine associated with the same channel from which the unique identifier was transmitted. In one embodiment, the characters of the remaining streams may have been sequentially interleaved. In such an embodiment, the characters of the remaining streams may be sent sequentially to modified receive PCS state machines corresponding to the channels from which they were sent.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
   receiving two or more Ethernet streams from a media access control (MAC) layer of separate media independent interfaces;
   modifying one or more Ethernet streams of the received Ethernet streams in a physical coding sublayer (PCS) to uniquely distinguish each of the two or more Ethernet streams one from another, wherein the two or more Ethernet streams share a single transmit character clock reference, and wherein said modifying comprises:
   generating identifiers to uniquely identify each of the one or more Ethernet streams;
   inserting each of the identifiers into a particular IDLE ordered set; and
   inserting the particular IDLE ordered set into one or more inter-packet gaps between packets of each of the one or more Ethernet streams; and
   interleaving any two or more of the modified Ethernet streams to form an aggregate Ethernet stream after inserting the particular IDLE ordered set into the one or more Ethernet streams.

2. The method of claim 1, wherein interleaving any two or more of the modified Ethernet streams to form an aggregate Ethernet stream comprises encoding the Ethernet stream and another Ethernet stream with an 8B/10B encoder.

3. The method of claim 1, further comprising:
   receiving the aggregate Ethernet stream; and
   searching the aggregate Ethernet stream for the identifier.

4. The method of claim 3, further comprising separating the received aggregate Ethernet stream into an Ethernet stream and another Ethernet stream based on the identifier.

5. The method of claim 1, wherein interleaving any two or more of the modified Ethernet streams to form an aggregate Ethernet stream comprises interleaving any two or more of the modified Ethernet streams on a character by character basis.

6. The method of claim 1, wherein the one or more Ethernet streams originate from a common dual-channel MAC layer, and wherein the one or more Ethernet streams are asynchronous to each other with respect to data flow, packet size, and inter-packet gap length and location.

7. The method of claim 1, wherein the one or more Ethernet streams are gigabit Ethernet streams, wherein the particular IDLE ordered set is different from ordered sets that are allowed under the gigabit Ethernet standard, and wherein said interleaving comprises interleaving characters of the two or more modified Ethernet streams in a fixed sequence to be demultiplexed in the fixed sequence.

8. An apparatus comprising:
   logic to implement a first instance of a physical coding sublayer (PCS) for a first Ethernet stream of packets, the logic to receive the first Ethernet stream from a media access control (MAC) layer of a first media independent interface, to generate a first identifier to uniquely identify the first Ethernet stream, to insert the first identifier into a particular IDLE ordered set that is inserted into one or more inter-packet gaps between the packets of the Ethernet stream, and to
   implement another instance of the PCS for a second Ethernet stream of packets, the logic to receive the second Ethernet stream from a media access control (MAC) layer of a second media independent interface, to generate a second identifier to uniquely identify the second Ethernet stream, to insert the second identifier into the particular IDLE ordered set that is inserted into one or more inter-packet gaps between packets of the second Ethernet stream; and
   an encoder to receive the Ethernet stream and the other Ethernet stream and aggregate them into an aggregate Ethernet stream.

9. The apparatus of claim 8, further comprising a clock tolerance management block to perform rate adaptation for the Ethernet stream.

10. The apparatus of claim 9, wherein the clock tolerance management block to perform rate adaptation for the Ethernet stream comprises a clock tolerance management block to perform rate adaptation by deleting one or more characters from one or more inter-packet gaps of the Ethernet stream.

11. The apparatus of claim 9, wherein the clock tolerance management block to perform rate adaptation for the Ethernet stream comprises a clock tolerance management block to perform header compression by removing one or more fixed preamble characters from one or more packets of the Ethernet stream.

12. The apparatus of claim 8, wherein the first and second Ethernet streams originate from a common dual-channel MAC layer, and wherein the first and second Ethernet streams are asynchronous to each other with respect to data flow, packet size, and inter-packet gap length and location.

13. The apparatus of claim 8, wherein the first and second Ethernet streams are gigabit Ethernet streams, wherein the particular IDLE ordered set is different from ordered sets that are allowed under the gigabit Ethernet standard, and wherein said interleaving comprises interleaving characters of the two or more modified Ethernet streams in a fixed sequence to be demultiplexed in the fixed sequence.

14. An article of manufacture comprising:
- a computer readable medium having computer instructions that, when executed by a computer, cause the computer to
- receive two or more Ethernet streams from a media access control (MAC) layer of separate media independent interfaces, wherein the two or more Ethernet streams share a single transmit character clock reference;
- modify one or more Ethernet streams to uniquely distinguish the Ethernet stream from one another be:
  - generating identifiers to uniquely identify each of the one or more Ethernet streams;
  - inserting each of the identifiers into a particular IDLE ordered set; and
  - inserting the particular IDLE ordered set into one or more inter-packet gaps between packets of each of the one or more Ethernet streams; and
- interleave any two of the Ethernet streams to form an aggregate Ethernet stream after inserting the particular IDLE ordered set.

15. The article of manufacture of claim 14, wherein the Ethernet stream and the other Ethernet stream have approximately the same transmission rate.

16. The article of manufacture of claim 15, wherein the instructions further cause the apparatus to transmit the aggregate Ethernet stream over a link at approximately twice the transmission rate of the Ethernet stream and the other Ethernet stream.

17. The article of manufacture of claim 14, wherein the one or more Ethernet streams originate from a common dual-channel MAC layer, and wherein the one or more Ethernet streams are asynchronous to each other with respect to data flow, packet size, and inter-packet gap length and location.

18. The article of manufacture of claim 14, wherein the one or more Ethernet streams are gigabit Ethernet streams, wherein the particular IDLE ordered set is different from ordered sets that are allowed under the gigabit Ethernet standard, and wherein the instructions that cause the apparatus interleave characters of the two or more modified Ethernet streams in a fixed sequence to be demultiplexed in the fixed sequence.

* * * * *